UNITED STATES PATENT OFFICE.

JOSEPH KOETSCHET AND MAURICE BEUDET, OF LYON, FRANCE, ASSIGNORS TO SOCIETE CHIMIQUE DES USINES DU RHONE (ANCIENNEMENT GILLIARD P. MONNET ET CARTIER), OF PARIS, FRANCE.

MANUFACTURE OF CELLULOSE ESTERS.

1,389,250.  Specification of Letters Patent.  Patented Aug. 30, 1921.

No Drawing.  Application filed January 12, 1921.  Serial No. 436,795.

*To all whom it may concern:*

Be it known that we, JOSEPH KOETSCHET, of 67 Boulevard des Belges, Lyon, France, a citizen of the Confederation of Switzerland, and MAURICE BEUDET, of 25 Rue Bugeaud, Lyon, France, a citizen of the French Republic, chemists, have invented certain new and useful Improvements in or Relating to the Manufacture of Cellulose Esters, (for which I have filed applications in France, June 20, 1919, and in Great Britain, June 3, 1920,) of which the following is a specification.

In a previous specification, Patent No. 1258913, one of the present inventors has described a method of preparation of cellulose acetates consisting in converting the cellulose into a fluid mass by a preliminary treatment with glacial acetic acid containing from 1 to 20% acetic anhydrid in presence of a condensing agent, acetylating the product with a further quantity of acetylating agent and precipitating the acetyl produced after or without a partial saponification.

In the above specification only one example is quoted in which the temperature at which the reaction is caused to take place is 30° C. and the quantity of sulfuric acid used is 5% of the cellulose to be acetylated. In proceeding according to this example an acetate of cellulose is obtained which has the following properties: It is insoluble in nitrobenzene, acetone and ether, very little soluble in alcohol and easily soluble in chloroform.

The process described in this specification No. 1,258,913 is susceptible of very wide application; we have discovered that by varying the strength of acid and that by varying the proportions and the temperature at which the reaction is caused to take place the process yields products the properties of which are very different to those indicated in the only example quoted.

The present invention relates to a variation of the example quoted in the specification No. 1,258,913 by means of which very different products are obtained, and notably products which are insoluble in chloroform. The variation consists in attenuating the preliminary treatment described in the above mentioned specification. This attenuation may be obtained in two ways; either the temperature may be reduced below the temperature mentioned in the example, that is below 30° C., to a variable extent, possibly down to 0° C. or else the proportion of sulfuric acid to the cellulose used may be decreased below the proportion mentioned in the example, that is it may be reduced below 5%. It is understood that both methods may be used simultaneously, and that the temperature may be reduced together with a diminution in the quantity of sulfuric acid.

The following examples give products having different properties than those of the example given in the specification quoted above.

*Example I.*

100 parts of cellulose are maintained in contact for 3 to 4 hours at 25° C. with a mixture constituted as follows:—

Acetic acid 100%, 610 parts.
Sulfuric acid 100%, 5 parts.
Acetic anhydrid, 50 parts.

The cellulose disintegrates rapidly and soon constitutes a homogeneous paste very easily stirred.

One adds then 250 parts of acetic anhydrid. By maintaining the temperature at about 40° C. one obtains, after from 1 to 2 hours, a perfectly clear viscous mass which, precipitated in water gives a cellulose acetate which is insoluble in chloroform but which becomes translucent in it and swells considerably.

*Example II.*

Instead of being directly precipitated, the acetylated substance obtained as in Example I is first partially saponified. New products are then easily obtained, some of which are insoluble in chloroform and soluble in acetone, while some art, for instance, soluble in ethyl acetate.

*Example III.*

610 parts acetic acid 100%
3 parts sulfuric acid 100% and
50 parts acetic anhydrid
are added to 100 parts of cellulose.

The mixture is heated at 29° C. for about 4 hours. At the end of this time the reacting mass presents the appearance of a mash which can easily be triturated and which lends itself perfectly to acetylation.

This acetylation is performed in conditions exactly identical to those of Example I. It produces also a cellulose acetate insoluble in chloroform.

*Example IV.*

The acetate obtained as described in Example III, when partly saponified, leads to the production of new acetates, some of which are insoluble in chloroform and soluble in acetone.

These examples may of course be varied between wide limits, with respect to the quantity of condensing agent, and the temperature at which the preliminary treatment takes place, provided that the variations are such as to attenuate the said treatment.

What we claim and desire to secure by Letters Patent is:—

1. In the process of the manufacture of cellulose acetate in which the cellulose is converted into a fluid mass by subjecting it to a preliminary treatment with glacial acetic acid containing 1 to 20 per cent. of acetic anhydrid and sulfuric acid as a condensing agent, maintaining the temperature above 0° C. and below 30° C. during the preliminary process, whereby the product of the acetylation obtained is insoluble in chloroform.

2. In the process of the manufacture of cellulose acetate in which the cellulose is converted into a fluid mass by subjecting it to a preliminary treatment with glacial acetic acid containing 1 to 20 per cent. of acetic anhydrid and sulfuric acid as a condensing agent, maintaining the temperature above 0° C. and below 30° C. during the preliminary process, the proportion of sulfuric acid to the cellulose used being less than 5 per cent., whereby the product of the acetylation obtained is insoluble in chloroform.

3. The preliminary treatment of the process of manufacture of a cellulose acetate insoluble in chloroform consisting in maintaining at 25° C. for 3 to 4 hours a mixture of 100 parts of cellulose, 610 parts of acetic acid 100%, 5 parts of sulfuric acid 100%, 50 parts of acetic anhydrid.

4. The new products obtained by the process claimed in claim 1, being acetates of cellulose insoluble in chloroform.

In testimony whereof we have signed our names to this specification.

JOSEPH KOETSCHET
MAURICE BEUDET.

Witnesses:
CYRUS B. FOLLMER,
LUCIENNE BOUVERET.